| United States Patent [19] | [11] Patent Number: 4,975,513 |
|---|---|
| Kim et al. | [45] Date of Patent: Dec. 4, 1990 |

[54] PROCESS FOR PREPARING HYDROXYL POLYESTER FOR USE IN A POWDER COATING AND A POWDER COATING COMPOSITION THEREOF

[75] Inventors: Bong J. Kim, Suwon; Won S. Kim, Incheon, both of Rep. of Korea

[73] Assignee: Korea Chemical Co., Inc., Japan

[21] Appl. No.: 291,613

[22] Filed: Dec. 29, 1988

[30] Foreign Application Priority Data

Dec. 31, 1987 [KR] Rep. of Korea ..................... 15750

[51] Int. Cl.$^5$ .............................................. C08G 18/80
[52] U.S. Cl. ..................................... 528/45; 528/285; 528/296
[58] Field of Search ........................... 528/45, 285, 296

[56] References Cited

U.S. PATENT DOCUMENTS 4,217,440  8/1980  Barkey ................................. 528/296

*Primary Examiner*—Maurice J. Welsh
*Attorney, Agent, or Firm*—Lowe, Price, Leblanc, Becker & Shur

[57] ABSTRACT

A crystalline polyester resin derived from the reaction between a prepolymer and trimellitic anhydride in an amount of less than 10 wt % of the prepolymer where prepolymer as an intermediate product formed from the reaction between an alcohol mixture containing at least 40 mole % ethylene glycol and at least 30 mol % neopentyl glycol, and an acid mixture containing terephthalic acid or dimethyl terephthalate of at least 40 mole % and a linear dicarboxylic acid, or between an alcohol mixture containing 100 wt % terephthalic acid or dimethyl terephthalate. The crystalline polyester resin is very suitable for use in powder coating compositions and has a hyodroxyl number of 20 to 100, an average molecular weight of 1000 to 3500 and a melt viscosity at 160° C. of 500 to 4000 cps as well as the characteristics of dense, regular, and repetitive structure.

15 Claims, No Drawings

4,975,513

PROCESS FOR PREPARING HYDROXYL POLYESTER FOR USE IN A POWDER COATING AND A POWDER COATING COMPOSITION THEREOF

BACKGROUND OF THE INVENTION

1. Field of the Invention

The present invention relates to a process for preparing polymers useful for powder coatings and is especially concerned with a thermosetting hydroxyl polyester resin which has more than 2 hydroxyl groups at the terminal of its polymer chain and is prepared using blocked isocyanate as a curing agent. Also, the present invention relates to powder coating compositions containing the above polymers.

2. Description of the Prior Art

The polyester resin among various powder coatings has a glass transition temperature of at least 50° C. which allows for storage stability and when being cured, emphasizes the characteristics of flow as a coating media to provide outstanding appearance and gloss at its surface. Therefore, the appearance of coating surface is improved and orange peel phenomena is minimized because the melt viscosity of resin is lower.

In the conventional polyester resin as used in powder coating to date, the glass transition temperature (Tg) is increased above 50° C. and melt viscosity is also increased. Therefore, the coatings are not flowed-out well during curing and appear to have orange peel phenomena and occasionally blister and pin hole phenomena.

There are two methods to finish steel with coatings; pre-coating and post-coating. The steel coated with pre-coating method is called PCM and the paints for use in this method are PCM coatings. When using powder coatings for PCM, it can save time to paint, since the product is derived directly from machining the pre-coated steel. This avoids tediousness, maximizes the productivity resulting from mass production systems.

The conventional hydroxyl polyester resins are produced by using polycarboxylic acid such as terephthalic acid and isophthalic acid, and polyhydric alcohol such as neopentyl glycol, trimethylol propane, propylene glycol and cyclohexane dimethanol. However, these kinds of resins have relatively higher melt viscosities usually of 6000 cps at 160° C. and occasionally more than 10000 cps. The high melt viscosity restricts the flow of molten coating and moreover degrades gloss and appearance. Also, the speed of cure is relatively slower than that of crystalline polyester at certain temperature so that it is inclined to have poor physical properties compared with crystalline polyester. Therefore, higher cure temperatures or more cure time is required to obtain better physical properties.

In the conventional crystalline resin, crystallinity is so emphasized that the coating appearance at the surface is relatively better, but the chemical resistance and resistance against weather, solvent, stain, and salt spray is adversely affected. Therefore, it is known to be very difficult to make high quality coatings with good appearance. For example, European Patent No. 0070118 describes producing crystalline polyester resin using terephthalic acid, isophthalic acid, and 1,6-hexanediol. In this case, better appearance and gloss with good storage stability compared with the conventional resin is provided since the resin has an average molecular weight of 700 to 3000, a melt viscosity at 160° C. of 50 to 3000 cps, and a hydroxyl number of 30 to 160. However, resistance against weather, solvent salt spray and chemical resistance are still poor. Moreover, stain resistance and bending characteristic absolutely required to upgrade quality are so poor that it is somewhat difficult to use the polyester as a high quality PCM (Pre-Coated Metal) coating.

SUMMARY OF THE INVENTION

The present invention relates to a process for preparing crystalline polyester resins, which are superior to any other typical crystalline or conventional polyester resin for powder coating, by reacting prepolymer as intermediate product described herein with trimellitic anhydride. In the process of formation of the prepolymer, an alcohol mixture mainly containing ethylene glycol and neopentyl glycol is reacted with an acid mixture having a linear dicarboxylic acid with terephthalic acid or dimethyl terephthalate, or the said alcohol mixture is reacted with one of terephthalic acid and dimethyl terephthalate.

The present invention overcomes some defects found in conventional amorphous and crystalline polyester resin having similar molecular weight particularly appearance, gloss, resistance against weather and solvent, chemical resistance, resistance against stain, and bending.

DETAILED DESCRIPTION OF THE INVENTION

The process according to the present invention comprises (a) the first step of preparing a prepolymer having a hydroxyl number of 50 to 150 by reacting an alcohol mixture containing more than 40 mole % ethylene glycol and more than 30 mole % neopentyl glycol with an acid mixture having a linear dicarboxylic acid containing more than 40 mole % of terephthalic acid or dimethyl terephthalate, or solely terephthalic acid or dimethyl terephthalate wherein the mole ratio of alcohol mixture to acid mixture is about 1.05 to about 1.3 and; (b) the second step of preparing a crystalline polyester resin having hydroxyl number of 20 to 100, an average molecular weight of 1000 to 3500 and a melt viscosity at 160° C. of 500 to 4000 cps by reaction of the prepolymer with trimellitic anhydride. The above prepolymer and trimellitic anhydride (of less 10 weight percent of prepolymer) is used to prepare a crystalline polymer that has dense, regular and repetitive structure.

The present invention is based on the principle that a monomer having symmetric rather than asymmetric structure enhances the crystallinity of the polymer. The present invention therefore provides for the preparation of a crystalline polymer which is dense and has a regular and repetitive structure. The regularity of structures provided between the molecules on the basis of forming regularly arrayed atoms among the dense and regular structure in molecules.

The crystalline polyester resin according to this invention has lower melt viscosity compared with the conventional resins having similar molecular weight. The lower melt viscosity allows the crystalline polyester resin to sufficiently flow out evenly and to eliminate orange peel phenomena and thereby produce smooth and outstanding gloss coatings. Since crystalline polyester resin according to this invention is rapidly reacted with blocked isocyanate used as a curing agent, it may be cured at a lower temperature than other resins.

Moreover, the crystalline polyester resin also shows outstanding physical properties at the same curing temperature.

The crystalline polyester resin according to this invention has higher glass transition temperature (Tg) than other conventional resins having similar molecular weight. Therefore, it has a good storage stability and may be used in various fields by controlling composition and molecular weight. It also has better hiding power with better pigment wetting ability than conventional resins, so it can be used in thin film coatings.

Moreover, crystalline polyester resins according to the present invention overcome some disadvantages associated with conventional and crystalline polyester resins, such as problem of storage stability, resistance against weather and solvent, and chemical resistance, especially resistance to stain and bending. Therefore, the crystalline polyester resins according to the present invention can be used as resin for PCM coatings.

The detailed process according to the present invention comprises: (a) the first step of preparing a crystalline polyester resin by monomers having 100% symmetric structure rather than asymmetric structure; and (b) the second step the enhancing chemical and solvent resistance of resin by means of forming partial branch structure in the polymer chain by inducing trimellitic anhydride moiety having aromatic structure and three carboxyl functional groups. It is preferred to add trimellitic anhydride at 0.5 to 10 mole % among the acid mixture since the characteristics of crystallinity is decreased in case of adding too much. It is also characterized to prepare superior crystalline polymer in view of smoothness, resistance against weather and stain because of using linear polyhydric alcohol having no branched functional group with less six carbon number, acid monomer having no branched functional group, and acid monomer having branched functional group, in a range for avoiding degradation of crystallinity. In this regard, terephthalic acid or dimethyl terephthalate or an acid compound composed dicarboxylic acid having 4 to 12 carbons with more than 40 mole % of one of the Terephthalic Acid or Dimethyl Terephthalate is reacted with an alcohol mixture containing more than 40 mole % ethylene glycol and more than 30 mole % neopentyl glycol. The alcohol mixture may include 1,4-butanediol, 1,5-pentanediol, 1,6-hexanediol, 1,4-cyclohexane dimethanol, diethylene glycol, and partially multifunctional monomer in some cases. The alcohol mixture may further be include trimethylol propane (TMP), trimethylol ethane (TME), pentaerythritol, glycerine and sorbitol. Isophthalic acid is not used to prepare present invention because it is asymmetry and degrades crystallinity. The mole ratio of alcohol to acid is about 1.05 to about 1.3 and monobutyl tin chlorodihydroxide or dibutyl tin oxide is used a catalyst in an amount of 0.1 to 2 wt % based total weight. The reaction proceeds at a temperature in the range of 170° C. to 240° C. proportionally until water is not detected any more, and in this case acid value is less than 15 value and hydroxyl number are 50 to 150, respectively.

In the second reaction, the prepolymer is cooled as low as 170° C. and is reacted with trimellitic anhydride having less than 10 wt % of prepolymer. When the acid value is less than 5 after react proportionally to the temperature in the range from 170° C. to 240° C., antimony triacetate (product name: S-21, M & T) of 0.01 to 2.0 wt % of the total resin is added into the total resin and reacted in an excess of nitrogen gas blowing until the resin has a predetermined viscosity and molecular weight. In the reaction, antimony triacetate is used as a catalyst to promote a polycondensation reaction so that it can reduce the reaction time to prepare the resin.

The resin as a final product is almost all linear crystalline and has an acid value of less than 3, a hydroxyl number of 20 to 100, an average molecular weight of 1000 to 3500, and a melt viscosity at 160° C. of 500 to 4000 cps. at 160° C.

The polyester resin according to the process of the present invention uses blocked isocyanate which is prepared by first reacting IPDI (Isophoronediisocyanate) with a poly alcohol such as ethylene glycol, and thereby is blocked with caprolactam as a curing agent. Specific examples are Adduct B 989 (Veba-Chemie Co.), Adduct B 1065 (Veba-Chemie Co.), Hüls B 1530. Using this blocked polyester resin has been found to be more advantageous for forming smooth surfaces with excellent appearance, gloss and for preventing orange peel phenomena at the curing reaction since the curing agent is non-activated or neutralized after dissociation of blocking agent. Therefore, the coating flows out very easy. The weight ratio of polyester resin to curing agent is preferably 90/10 to 70/30.

In actual preparation of the coating, tin octoate or dibutyl tin diaurylate, which plays a role in catalyst to promote crosslinking and is present at less than 1 wt % of total weight of coating, is also used with the curing agent. In addition, a flowing agent of less than 1 wt % of total coating such as Byk powder-Flow3 (Byk Mallinckrodt Co.), Acronal 4F (BASF Co.) and Modaflow (Monsanto Co.) may be used in the field of powder coating to improve the flow of the coating. To avoid discoloration, Irganox 1093 or Irganox 1076 (Ciba-Geigy Co.) may be added as a stabilizer moiety in the resin. The method of preparation of coating is the same as the process of conventional powder coating.

To comprehend the characteristics of the present invention, the EXAMPLES and COMPARATIVE EXAMPLES are introduced as follows:

EXAMPLE 1

1329.2 grams of Terephthalic acid, 310.0 grams of ethylene glycol, and 499.2 grams of neopentyl glycol were reacted at a temperature in the range of from 170° C. to 240° C. under nitrogen gas after inducing 1.5 grams of triphenyl phosphite as a thermal stabilizer, and 2 grams of monobutyl chlorotin dihydroxide as ester catalyst until the water in the reaction no longer comes out. At this moment, the acid value and hydroxyl number were 9.3 and 115, respectively.

The reactants were cooled to 170° C. and reacted with 51.23 grams of trimellitic anhydride with the temperature increasing up to 200° C. When the acid value of resin was lower than 5, a polycondensation reaction with 1.3 grams of antimony triacetate as a catalyst under the environment of excess nitrogen blowing occurred. The reaction continued until it reached a pre-determined viscosity and then the resin was discharged. The resin had a melt viscosity at 160° C. of 2650 cps, a hydroxyl number of 54, an acid value of 0.86 and an average molecular weight of 2153.

EXAMPLE 2

In the same manner as EXAMPLE 1 above, 1495.1 grams of terephthalic acid, 403 grams of ethylene glycol, 416 grams of neopentyl glycol, and 45 grams of 1,4-butanediol derive prepolymer were reacted with 49 grams of trimellitic anhydride to produce a final resin having an average molecular weight of 2930, a melt viscosity at 160° C. of 3150 cps, a hydroxyl number of 61, and an acid value of 1.3.

COMPARATIVE EXAMPLE 1

1162.9 grams of terephthalic acid, 332.3 grams of isophthalic acid, 520 grams of neopentyl glycol and 223 grams of propylene glycol were reacted with 1.9 grams of dibutyl tin oxide induced as an esterification catalyst at a temperature of up to 240° C. The reaction was stopped when the resin reached pre-determined viscosity. This final resin had an average molecular weight of 2100, a melt viscosity at 160° C. of 3830 cps, a hydroxyl number of 58, and an acid value of 2.05.

COMPARATIVE EXAMPLE 2

In the same manner as the above COMPARATIVE EXAMPLE 1, 996.8 grams of terephthalic acid, 225 grams of 1,4-butanediol, 531 grams of 1,6-hexanediol, 12 grams of ethylene glycol, and 1.6 grams of dibutyl tinoxide were reacted with each other to produce a resin. The resin had an average molecular weight of 1880, a melt viscosity of 2030 cps, hydroxyl number of 64, and an acid value of 2.65.

In order to evaluate physical properties of the resins as coatings, coatings using the resins of the above examples were made by reacting a mixture having the following components and compositions, which is the same process used for preparing a typical powder coating: 368 grams of titanium dioxide, 112 grams of caprolactam blocked isocyanate, 338 grams of polyester resin, 4.1 grams of modaflow, and 1.5 grams of tin octoate. The thickness of film on the steel surface was about 45+/−5 μm. The cure condition was at 250° C. surface temperature for 1 minute which is similar to the case for PCM coatings. The following Table shows the physical properties of coatings on cold rolled steel having 0.5 mm thickness and treated with zinc phosphate paste about 1.8 to 2.3 grams/cm$^2$.

TABLE

| ITEM | | EXAMPLE I | EXAMPLE II | COMPARATIVE EXAMPLE I | COMPARATIVE EXAMPLE II |
|---|---|---|---|---|---|
| Appearance | | Excellent | Excellent | Good | Excellent |
| Gloss (60°) | | 98–100 | 99–100 | >95 | 98–100 |
| Pencil Hardness | | >H | >H | F | HB |
| Impact Resistance (¼ inch Diameter) | | 1 Kg × 70 cm | 1 Kg × 70 cm | 1 Kg × 40 cm | 1 Kg × 50 cm |
| Cross Cut | | 100/100 | 100/100 | >90/100 | 100/100 |
| Erichsen | | 10 mm | 9 mm | 5 mm | 7 mm |
| Solvent Resistance (*1) | | 1. no changes at the immersed portion | 1. no changes at the immersed portion | 1. gloss degradation 2. occurrence of blister at boundary | 1. gloss degradation 2. occurrence of blister at boundary |
| Thermal Resistance (*2) | | ΔE = 0.6–0.1 | 0.4–0.7 | 1.4–1.8 | 1.5–1.7 |
| Resistance of U.V (*3) | | ΔE = less 0.8 | less 1.0 | 1.2 | 1.6 |
| Bending Resistance (T Bending) | | good (O T) | good (O T) | good (above 3 T) | good (above 1 T( |
| Chemical Resistance (*4) | | good | good | 1. gloss degradation 2. occurrence of blister | 1. gloss degradation 2. occurrence of blister |
| Chemical Resistance (*5) | | good | good | 1. gloss degradation 2. occurrence of blister | 1. gloss degradation 2. occurrence of blister |
| Chemical Resistance (*6) | | good | good | bad | bad |
| Stain-resistance by "Magic" pen (*7) | RED | good | good | remains traces | remains traces |
| | BLUE | good | good | remains traces | remains traces |
| | BLACK | good | good | remains traces | remains traces |
| Storage Stability (*8) | | good | good | a little blocking | good |
| Resistance against Boiling Water (*9) | Appearance | good | good | gloss degradation | gloss degradation |
| | CROSS CUT | 100/100 | 100/100 | 90/100 | 100/100 |
| | Impact Resistance | 1 Kg × 70 cm | 1 Kg × 70 cm | 1 Kg × 30 cm | 1 Kg × 40 cm |
| | Bending Resistance | good (1 T) | good (1 T) | good (above 4 T) | good (above 3 T) |

| | EXAMPLE | EXAMPLE | COMPARATIVE | COMPARATIVE |
|---|---|---|---|---|
| ITEM | I | II | EXAMPLE I | EXAMPLE II |
| (T Bending) | | | | |

TABLE-continued (*1) Immersed in xylene for 24 hour
(*2) Checked after at 210° C. for 1 hour
(*3) Checked after in 20 W × 20 cm for 24 hours
(*4) Checked after in 5% NaOH for 500 hours
(*5) Checked after in 5% H$_2$SO$_4$ for 500 hours
(*6) Checked after in 5% NaCl fog at 40° C. for 500 Hours
(*7) Contaminated by locally available pen made by "MONAMI CO." in Korea and then washed by xylene after 24 hours
(*8) Stored at 40° C. for one week
(*9) Checked after 24 hours in boiling water at 98 +/− 2° C. for 1 hour From the above TABLE, the resin of this invention is found to be superior to the resins especially in regard to chemical resistance, thermal resistance, resistance against solvent, bending, U.V., and stain resistance as well as good appearance. Therefore, this crystalline polyester is suitable for use in not only high quality powder coatings for PCM but also other conventional fields of powder coatings.

We claim:

1. A method of preparing a substantially linear crystalline polyester resin which comprises the following steps:
   (a) reacting an acid selected from the group consisting of terephthalic acid and dimethyl terephthalate with an alcohol mixture including ethylene glycol as a major component to form a prepolymer; and
   (b) reacting said prepolymer with trimellitic anhydride under a nitrogen gas atmosphere to form a substantially linear crystalline polyester resin.

2. A method according to claim 1, wherein said acid further includes a linear dicarboxylic acid containing 4 to 12 carbon atoms.

3. The method of claim 2, wherein said acid includes one of said terephthalic acid or dimethyl terephthalate in an amount of at least 40 mole %, and said alcohol mixture includes ethylene glycol and neopentyl glycol in amounts of at least 40 mole % and at least 30 mole %, respectively.

4. The process of claim 1, wherein said alcohol mixture includes ethylene glycol, neopentyl glycol and any one of 1,4-butanediol, 1,6-hexanediol, 1,4-cyclohexane dimethanol, 1,5-pentanediol, and diethylene glycol.

5. The process of claim 1, wherein said trimellitic anhydride is present in an amount of less than 10 wt % of said prepolymer.

6. The process of claim 1, wherein antimony triacetate is used as a catalyst in amounts of 0.01 to 2 wt % of said total resin when said acid value of resin is as low as 5 during the second stage reaction of said trimellitic anhydride with prepolymer.

7. The process of claim 1, wherein said N$_2$ gas is added at a rate of from 2000 to 4000 cc/1 min.

8. The process of claim 1, wherein the final product has a melting viscosity of from 500 to 4,000 cps at 160° C., an average molecular weight of 1,000 to 3,500, and a hydroxyl number of 20 to 100.

9. A powder coating composition comprising:
   a blocked isocyanate, a flowing agent, a curing catalyst, a pigment, and a crystalline hydroxyl polyester produced according to the process of claim 1.

10. The process of claim 2, wherein said alcohol mixture includes ethylene glycol, neopentyl glycol and any one of 1,4-butanediol, 1,6-hexanediol, 1,4-cyclohexane dimethanol, 1,5-pentanediol, and diethylene glycol.

11. The process of claim 2, wherein said trimellitic anhydride is present in an amount of less than 10 wt % of said prepolymer.

12. The process of claim 2, wherein antimony triacetate is used as a catalyst in amounts of 0.01 to 2 wt % of said total resin when said acid value of resin is as low as 5 during the second stage reaction of said trimellitic anhydride with prepolymer.

13. The process of claim 2, wherein said N$_2$ gas is added at a rate of from 2000 to 4000 cc/1 min.

14. The process of claim 2, wherein the final product has a melting viscosity of from 500 to 4,000 cps at 160° C., an average molecular weight of 1,000 to 3,500, and a hydroxyl number of 20 to 100.

15. A powder coating composition comprising:
    a blocked isocyanate, a flowing agent, a curing catalyst, a pigment, and a crystalline hydroxyl polyester produced according to the process of claim 2.

* * * * *

UNITED STATES PATENT AND TRADEMARK OFFICE
CERTIFICATE OF CORRECTION

PATENT NO. : 4,975,513

DATED : December 4, 1990

INVENTOR(S) : Bong J. Kim et al

It is certified that error appears in the above-identified patent and that said Letters Patent is hereby corrected as shown below:

On the title page:

IN THE TITLE:

Please change the title to read
--PROCESS FOR PREPARING HYDROXYL POLYESTER POLYMER FOR USE IN A POWDER COATING AND A POWDER COATING COMPOSITION THEREOF--

Signed and Sealed this

Ninth Day of April, 1991

Attest:

HARRY F. MANBECK, JR.

Attesting Officer

Commissioner of Patents and Trademarks